United States Patent
Bennett, III et al.

(10) Patent No.: US 6,215,863 B1
(45) Date of Patent: Apr. 10, 2001

(54) METHOD AND APPARATUS FOR PROVIDING A STATION SET WITH ADVANCED TELECOMMUNICATIONS SERVICES

(75) Inventors: Raymond Walden Bennett, III, Naperville; Laura Marie Griffith, Dundee, both of IL (US); Arnold M. Lund, Louisville, CO (US)

(73) Assignee: Ameritech Corporation

( * ) Notice: Subject to any disclaimer, the term of this patent is extended or adjusted under 35 U.S.C. 154(b) by 0 days.

(21) Appl. No.: 08/999,299

(22) Filed: Dec. 29, 1997

(51) Int. Cl.$^7$ ..................................................... H04M 1/64
(52) U.S. Cl. ...................... 379/201; 379/211; 379/93.01; 379/219
(58) Field of Search ................................ 379/201, 90.01, 379/93.01, 93.05, 93.06, 93.09, 93.12, 93.17, 93.24, 100.01, 100.08, 207, 229, 230, 219, 220, 211

(56) References Cited

U.S. PATENT DOCUMENTS

| | | |
|---|---|---|
| 4,021,615 | 5/1977 | James et al. . |
| 4,442,319 | 4/1984 | Treidl . |
| 4,540,851 | 9/1985 | Hashimoto . |
| 4,653,085 | 3/1987 | Chan et al. . |
| 4,656,655 | 4/1987 | Hashimoto . |
| 4,885,766 | 12/1989 | Yasuoka et al. . |
| 5,086,385 | 2/1992 | Launey et al. . |
| 5,109,407 | 4/1992 | Fujita et al. . |
| 5,164,982 | 11/1992 | Davis . |
| 5,268,666 | 12/1993 | Michel et al. . |
| 5,287,515 | 2/1994 | Murai . |
| 5,311,507 | 5/1994 | Bedrossian . |
| 5,329,578 | * 7/1994 | Brennan et al. ..................... 379/211 |
| 5,349,633 | 9/1994 | Katz . |
| 5,369,700 | 11/1994 | Koura et al. . |
| 5,377,186 | * 12/1994 | Wegner et al. ...................... 379/201 |
| 5,392,345 | 2/1995 | Otto . |
| 5,483,582 | * 1/1996 | Pugh et al. ........................... 379/112 |
| 5,485,511 | * 1/1996 | Iglehart et al. ..................... 379/201 |
| 5,506,892 | 4/1996 | Kojima et al. . |
| 5,530,740 | * 6/1996 | Irribarren et al. .................. 379/212 |
| 5,553,223 | 9/1996 | Greenlee et al. . |
| 5,570,085 | 10/1996 | Bertsch . |
| 5,572,438 | 11/1996 | Ehlers et al. . |
| 5,577,041 | * 11/1996 | Sharma et al. .................... 379/93.11 |
| 5,577,118 | 11/1996 | Sasaki et al. . |
| 5,581,593 | 12/1996 | Engelke et al. . |
| 5,583,920 | 12/1996 | Wheeler, Jr. . |
| 5,592,538 | 1/1997 | Kosowsky et al. . |
| 5,610,910 | 3/1997 | Focsaneanu et al. . |
| 5,629,978 | * 5/1997 | Blumhardt et al. .................. 379/201 |
| 5,631,954 | * 5/1997 | Evans et al. ......................... 379/202 |
| 5,790,648 | * 8/1998 | Bailis et al. ......................... 379/230 |
| 5,838,682 | * 11/1998 | Dekelbaum et al. ................ 370/401 |
| 5,867,562 | * 2/1999 | Scherer ................................ 379/229 |

* cited by examiner

Primary Examiner—Krista Zele
Assistant Examiner—William J. Deane, Jr.
(74) Attorney, Agent, or Firm—Dale B. Halling; Brinks Hofer Gilson & Lione

(57) ABSTRACT

A telecommunications system and method are provided in which network-based telecommunication devices provide advanced telecommunications services. The station set of such a telecommunications system contains the elements necessary for the presentation of a user interface and for converting electrical signals to and from speech. The components that provide advanced telephony services and even basic telephony functionality such as touch-tone generation are remotely located from the station set in the telecommunications network.

6 Claims, 15 Drawing Sheets

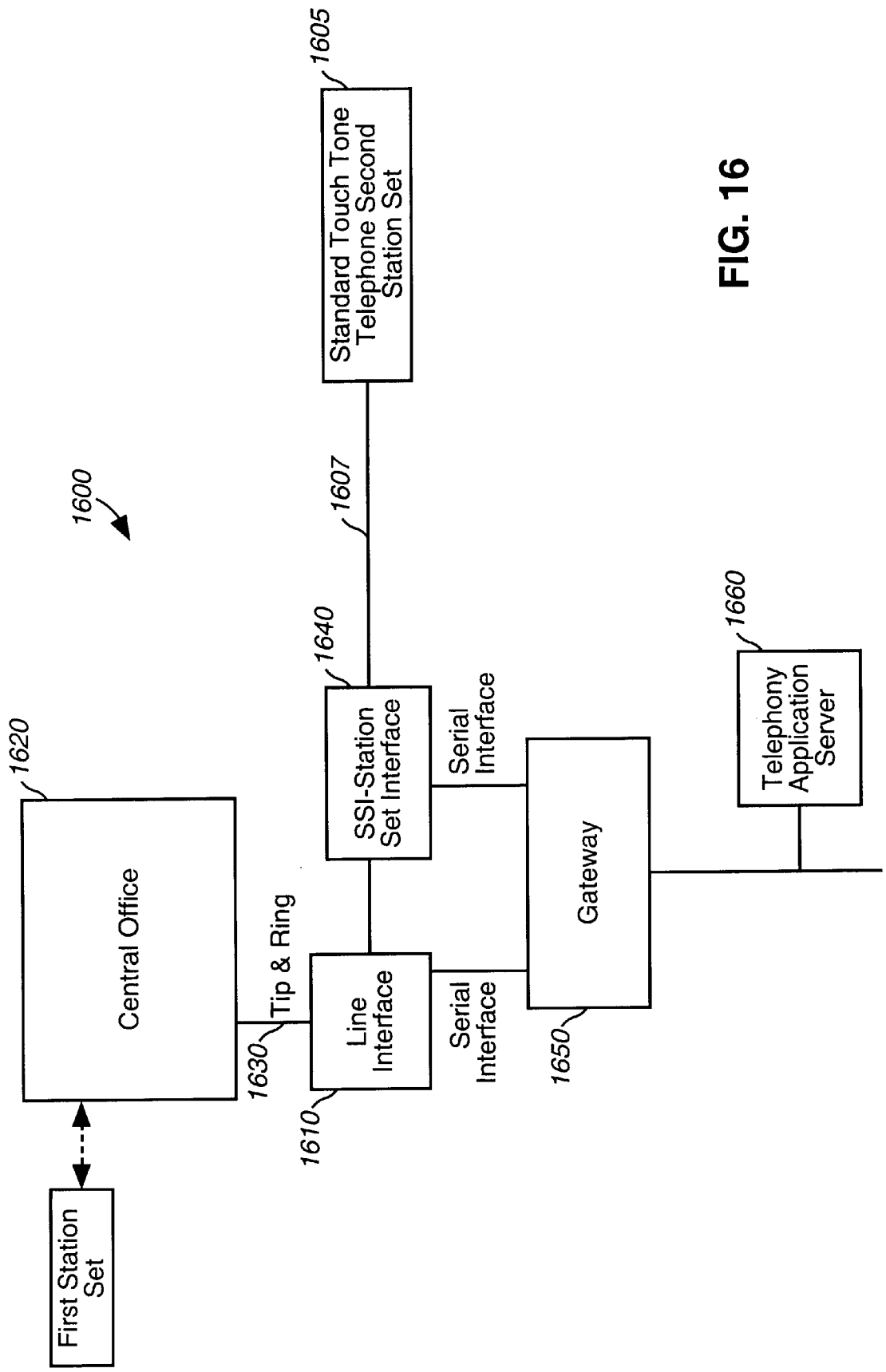

METHOD AND APPARATUS FOR PROVIDING A STATION SET WITH ADVANCED TELECOMMUNICATIONS SERVICES

TECHNICAL FIELD

The present invention relates generally to telecommunications services and more specifically to a new telecommunications system and method using network-based devices.

BACKGROUND

Since the early 1980s, it has been widely assumed that the familiar telephone will be replaced with an information appliance that will provide both telephony and information services. The common view is that the next generation telephone will look like a conventional telephone, but hidden inside will be what amounts to a personal computer. The prototypical "miniature-PC" station set has a processor, a display, a touch screen or other cursor-control device, and a keyboard on a pullout tray. In keeping with desktop personal computers, the miniature-PC station set can be built on software platforms such as Microsoft's Windows CE or can run on a Java virtual machine.

To a user, the miniature-PC station set integrates advanced telecommunications services that before were provided with a desktop personal computer equipped with an appropriate voice/data modem and telephony software. For example, an application running in a miniature-PC station set can maintain a personal directory of telephone numbers and display this directory as a list of names on the screen of the station set. When a user desires to phone a person on this list, he selects the name from the list instead of entering the person's telephone number. The telephone directory application running in the station set determines the phone number based on the selected name, and the miniature-PC station set transmits the necessary signals to a central office to place the call. In addition to running a telephone directory application, the miniature-PC station set can log incoming and outgoing calls, screen calls based on user-defined screening lists, and facilitate basic telephony functions such as putting one caller on hold to speak to another caller. If connected to a data network, the miniature-PC station set also can provide a user with access to email, online banking, database services, and Web browsing.

To the network, the miniature-PC station set appears and acts like any other touch-tone telephone. Basic telephony functionality (e.g., touch-tone generation, call-progress tone detection, etc.) is supported by analog telephony circuits contained in the station set. A processor in the station set receives messages from this circuitry when ringing voltage is applied to the line by a central office and also is informed when a typically digital-signal-processor-based circuit detects call progress tones (such as ring back, busy, fast busy), network error tones, or human speech. The processor also can use this circuitry to generate touch-tone signals to signal the central office to make a telecommunications connection between the station set and another station set.

There are several disadvantages associated with miniature-PC station sets. The first disadvantage relates to hardware and software upgrades. Because miniature-PC station sets are built on a PC-platform, they encounter the same problem that personal computers face—hardware with a relatively short life cycle. Accordingly, upgrades to the station set require frequent and costly hardware replacement. Additionally, because each station set is independent, there is no centralized method of distributing new software applications to the station sets. Hence, new applications must be manually loaded into each station set—a process that is made even more difficult if the station set has no mass storage device or removable media.

Another disadvantage is that a user has access only to applications loaded into his individual station set. Further, because software developers must design applications in light of the station set's limited processing and storage capabilities, development of new software applications is expensive and time consuming. These applications also must be developed to co-exist with other applications in the station set as well as with basic functions built into the station set's ROM.

There is, therefore, a need for a station set and telecommunications system that will provide the user with all of the benefits of the miniature-PC station set while overcoming its disadvantages.

BRIEF DESCRIPTION OF THE DRAWINGS

FIG. 16 is a block diagram of a telecommunications system of a preferred embodiment using a standard analog line and a conventional touch-tone telephone.

DETAILED DESCRIPTION OF THE PRESENTLY PREFERRED EMBODIMENTS

Figure 1:
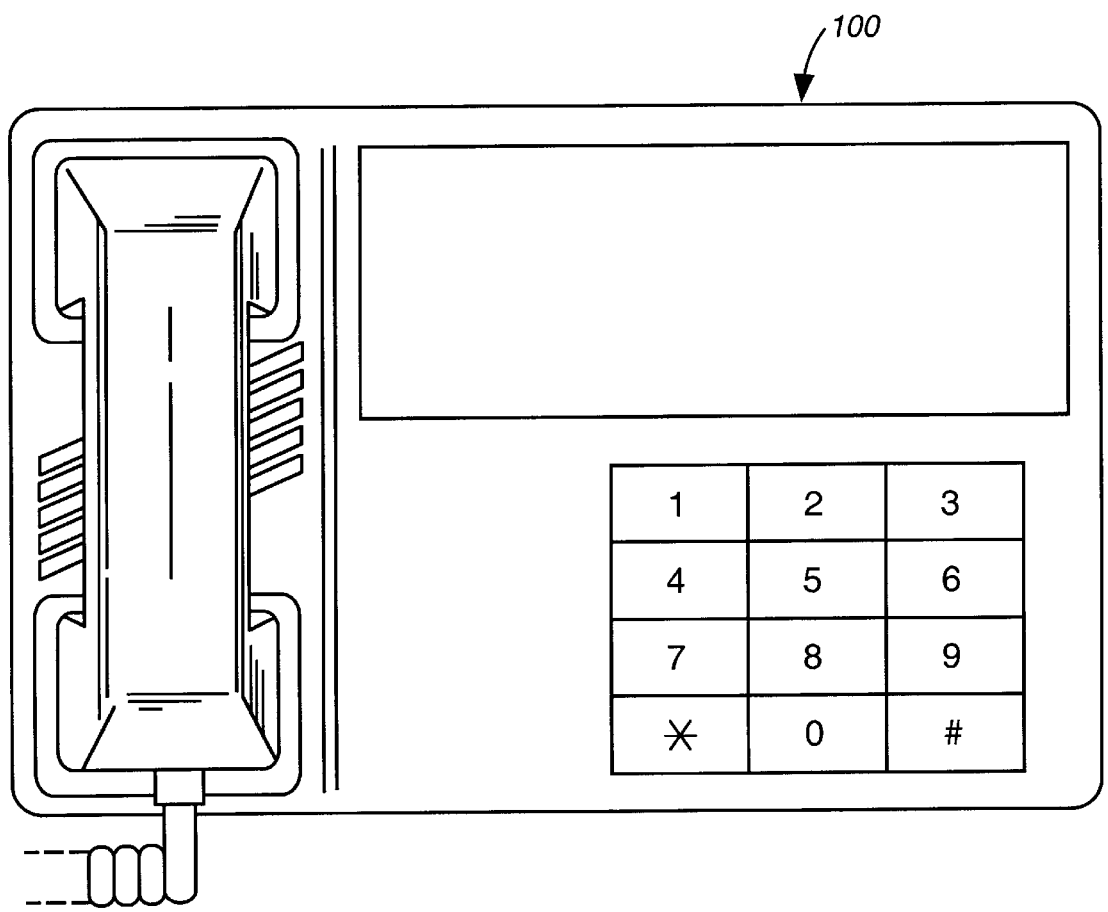
FIG. 1 is an illustration of a station set of a preferred embodiment.

In the telecommunications system of these preferred embodiments, a station set comprises user interface presentation elements, and the components that provide advanced telecommunications services and even basic telephony functionality are remotely located from the station set in the telecommunications network. With such redistributed functionality, the system provides a user with the benefits of a miniature-PC station set without its disadvantages. First, instead of using an expensive miniature-PC station set, a user can use a simple touch-tone telephone 100 (FIG. 1) to access advanced telecommunications services. Second, because the hardware and software that support the advanced telecommunications services are located in the network, the station sets of these preferred embodiments require less-frequent upgrades and have a much longer life cycle than a miniature-PC station set. Further, the hardware or software limitations of an individual's station set does not limit the types of services the user can access, and the user does not shoulder the burden of maintaining and updating the software supporting the services.

Figure 2:
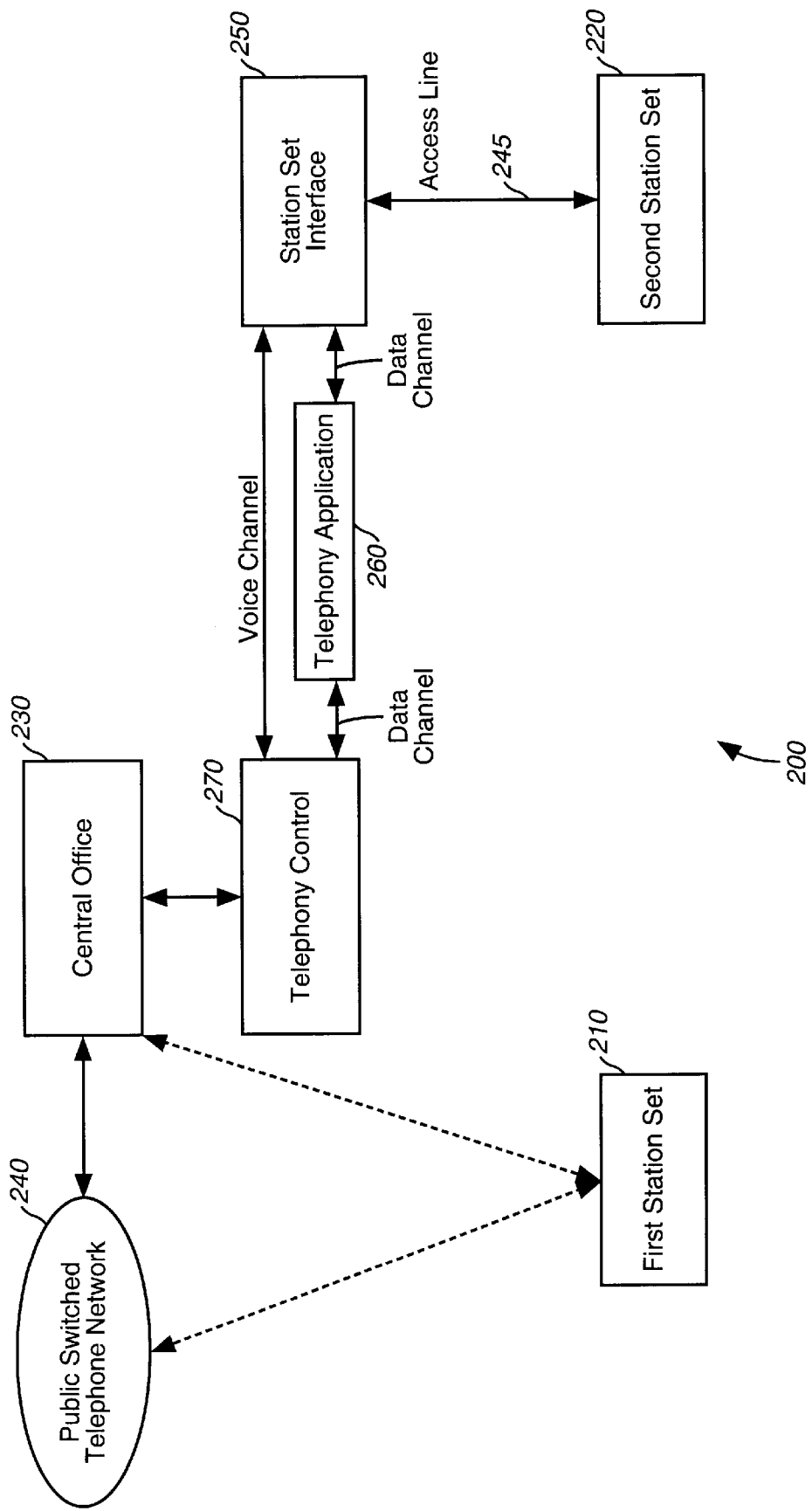
FIG. 2 is a block diagram of a telecommunications system of a preferred embodiment.

Turning again to the drawings, FIG. 2 is a block diagram of a telecommunications system 200 of a preferred embodiment having the redistributed functionality described above. As shown in FIG. 2, a first station set 210 associated with a first user is coupled, either through a central office 230 or through a public switched telephone network 240, with a second station set 220 associated with a second user. As used herein, the term "coupled with" means directly coupled with or indirectly coupled with through one or more components. The second station set 220 is coupled with a station set interface 250 via an access line 245. The station set interface 250 is coupled with a telephony application means 260 and a telephony control means 270, both of which are remotely located from the second station set 220. The function of each of these elements will be described more completely below.

The second station set 220 comprises user interface presentation elements (e.g., elements operative to present a user interface and to convert electrical signals to and from speech). The components that provide advanced telecommunications services (the telephony application means 260) and even basic telephony functionality such as touch-tone generation (the telephony control means 270) are remotely located from the second station set 220 in the telecommunications network. Because the second station set 220 does not contain any of the components necessary to generate switching signals to the central office 230, the second station set 220 merely sends a request to the telephony application means 260 to command the telephony control means 270 to generate the necessary signals to establish a telecommunications connection (i.e., a voice and/or data path) with the first station set 210. Either the first 210 or second 220 station sets can be a conventional telephone such as the telephone 100 of FIG. 1. In this way, the advantages of these preferred embodiments can be realized using existing telephone network structures and telephones. Alternatively, either station set can be a specially-designed station set equipped with a handset for providing voice communication and a touch screen for displaying objects sent to it by the telephony application means 260 and for collecting user input. This station set can comprise a speakerphone instead of a handset, and additional devices (such as a keyboard and mouse) can be used in conjunction with or instead of a touch screen to collect user inputs.

The station set interface 250 is responsible for passing analog voice signals through to the telephony control means 270 via a voice channel and for passing data signals to the telephony application means 260 via a data channel. As described in the ISDN embodiment discussed below, if voice signals are represented as digital signals intermingled with a stream of digital request signals, the station set interface 250 can pass all signals through the data channel to the telephony application means 260, which assumes responsibility for appropriately handling data and voice traffic.

Figure 3:
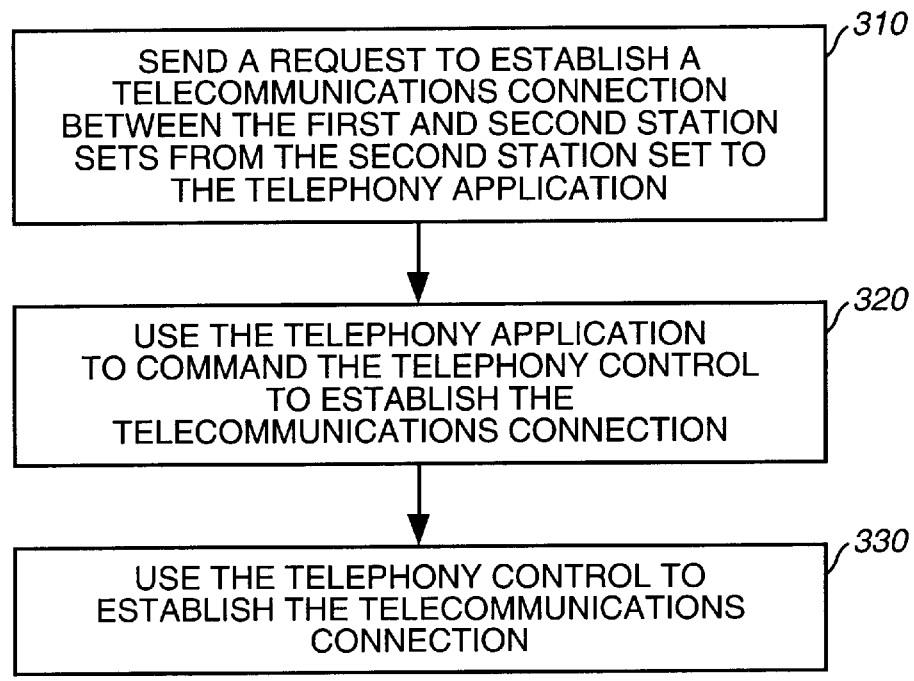
FIG. 3 is a flow chart of a method of a preferred embodiment for establishing a telecommunications connection.

The telephony control means 270 generates the appropriate signals to the central office 230 to establish a telecommunications connection between the first 210 and second 220 station sets. The telephony application means 260 comprises software and hardware (e.g., a server and a processor) to instruct the telephony control means 270 to generate the appropriate signals to the central office 230 to establish such a telecommunications connection. A method for establishing a telecommunications connection using such a system 200 is illustrated in the flow chart of FIG. 3. As shown in FIG. 3, this method comprises the steps of sending a request to establish a telecommunications connection between the first and second station sets from the second station set to the telephony application means (step 310), using the telephony application means to command the telephony control means to establish a telecommunications connection between the first and second station sets (step 320), and using the telephony control means to establish the telecommunications connection (step 330).

Two software applications running in the telephony application means 260 can facilitate the operation of this method. One application, referred to herein as a "User Agent", is responsible for determining the phone number of the user with whom a telecommunications connection is requested and for providing the user with access to advanced telecommunications services. The other application, referred to herein as a "Terminal Agent", collects and sends information from and to a station set with which it is associated. The Terminal Agent also is knowledgeable about network equipment (e.g., central office switches) and can instruct the telephony control means 270 to generate the appropriate signals to the central office 230 to establish a telecommunications connection between the station sets. Additionally, the Terminal Agent can change the appearance of the display of the second station set 220. If the second station set 220 has a processor and ROM (or other non-volatile memory) containing data describing the appearance of display screens and icons, the Terminal Agent can send an instruction to the processor to display a particular object rather than send the object itself. It is important to note that the User and Terminal Agent applications can be combined into one application.

When the second user places the second station set 220 off hook (e.g., when the second user picks up the handset), a message is passed to the Terminal Agent in the telephony application means 260 identifying the second station set 220. The Terminal Agent then generates a default User Agent for the second user. The User Agent allows the second user to place a request for a connection with another user or station set. Using the second station set 220, the second user enters his request to place a telephone call to the first user. Because the request can take any form (e.g., place a call to Bob, phone Acme Garage, etc.), the second user does not need to know the telephone number of the first user. The request is sent through the access line 245 to the station set interface 250, which passes it through the data channel to the Terminal Agent operating in the telephony application means 260. The Terminal Agent submits this request to the User Agent, which determines the phone number of the first user by using a local or remote look-up table, for example. Once it obtains the phone number, the User Agent communicates the number to the Terminal Agent, which commands the telephony control means 270 to generate the appropriate signals required for the central office 230 and/or public switched telephone network 240 to make a telecommunications connection between the first 210 and second 220 station sets. For example, the Terminal Agent can command the telephony control means 270 to generate touch-tone signals to a switch in the central office 230. Once this connection is established, the first and second users can communicate with one another via the voice channel.

Figure 4:
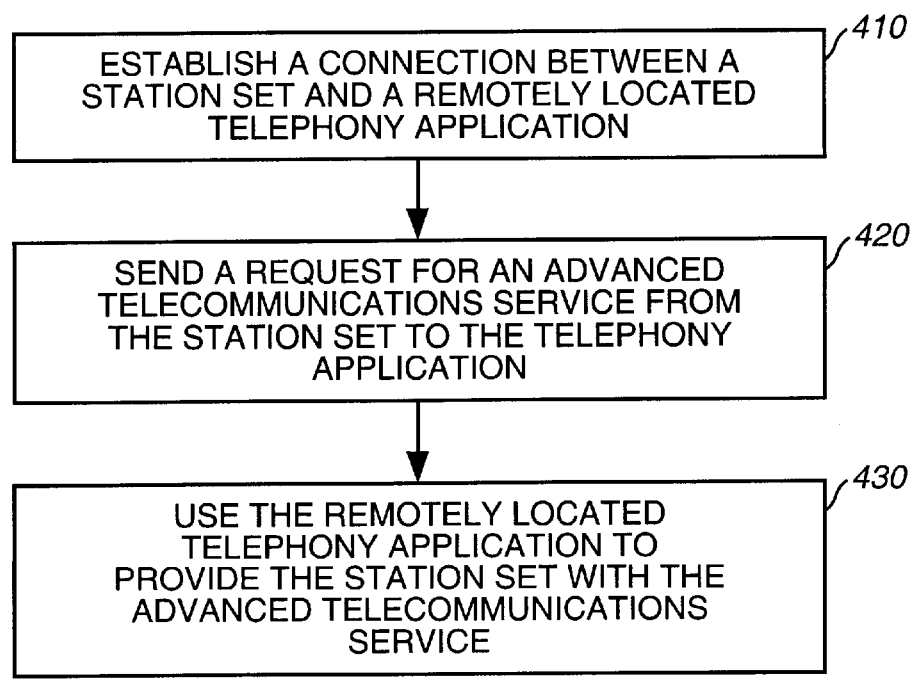
FIG. 4 is a flow chart of a method of a preferred embodiment for providing a user with access to advanced telecommunications services.

In addition to establishing telecommunications connections, the telephony application means 260 provides the second user with access to other advanced telecommunications services. As shown in the flow chart of FIG. 4, a method for providing these services comprises the steps of establishing a connection between the second station set and the remotely located telephony application means (step 410), sending a request for an advanced telecommunications service from the second station set to the telephony application means (step 420), and using the telephony application means to provide the second station set with the advanced telecommunications service (step 430). For example, the telephony application means 260 can provide the user with a log of incoming and outgoing calls, screen calls based on user-defined screening lists, and facilitate basic telephony functions such as putting one caller on hold to speak to another caller. The User Agent also can supply the Terminal Agent with a personal directory of telephone numbers for display on the second station set. Using this list, the second user can select the name of the first user, and the User Agent can determine the phone number of the first user based on the selected name.

In addition to personal directory applications, new telephony applications can be added without making any change to the hardware or software of the station set. For example, suppose that a manufacturer of network equipment develops a "visual voice mail" interface that will allow users to see a list showing the names of callers and the lengths of their messages. This information can be stored in a local server or in a remote server accessed through a data network. New software for the telephony application means 260 can be developed to allow users to interact with these lists (e.g., play messages, delete messages, forward messages, etc.) without making any changes in the software or hardware of the second station set 220. Additional user interfaces also can be made available, and a user can choose a default interface from a user menu, for example.

An additional advantage of having centralizing software applications on the network rather than at individual station sets is that customized applications will be available to a user no matter which station set he uses. Once the user identifies himself to the station set, his customized preferences (e.g., preferred long-distance carrier) or features (e.g., a single button that places a three-way call to two particular people) will be made available to him. In this way, since a user will be interacting with his own user agent, the user will have immediate access to his personal information (e.g., personal telephony directories, voice mail and email, status of travel reservations, etc.) no matter which station set he uses.

In the embodiments described above, a generic or default User Agent was created to allow the second user to place a request for a telecommunications connections with the first user. Instead of a generic User Agent, a customized User Agent can be created if the user can identify himself to the station set by, for example, typing an ID and password, using a smart card, or picking a name from a list. If a user elects to identify himself to the station set, the Terminal Agent forwards the identification information to a User Agent process, which queries a database to create a User Agent customized for that particular user. The User Agent database can be stored in a local server or in a remote server accessed through a data network, in which case the name of the user is converted to a description of how to find the corresponding User Agent in the network. For example, if a user's User Agent is stored in a database near Chicago and the user identifies himself to a station set in San Francisco, the server near Chicago can send the local server in San Francisco enough information to allow it to run a copy of the User Agent. Alternatively, the User Agent can run in Chicago, and the network can pass messages between the Terminal Agent in San Francisco and the User Agent in Chicago.

Figure 5:
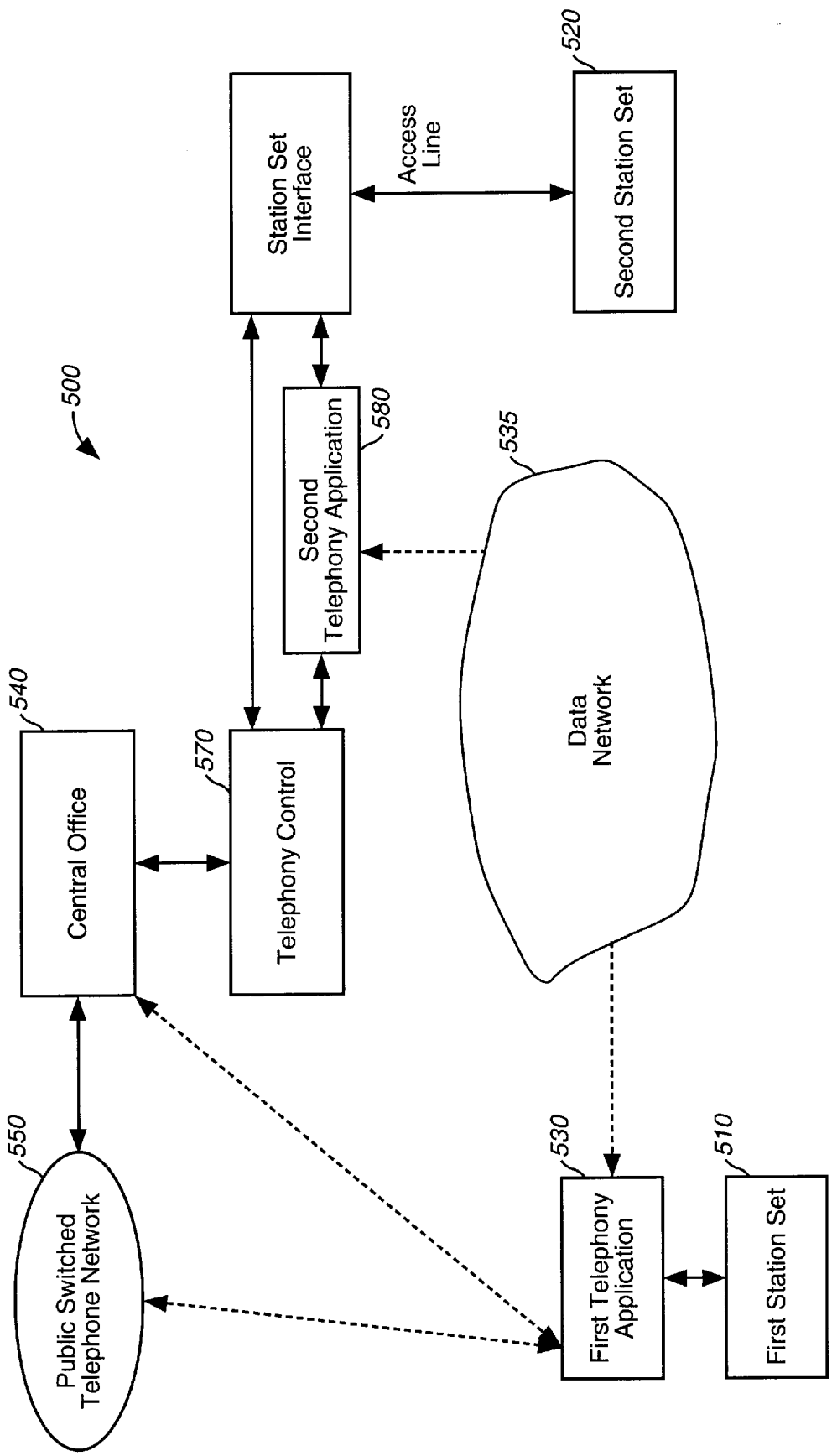
FIG. 5 is a block diagram of a telecommunications system of another preferred embodiment.

Turning again to the drawings, FIG. 5 is a block diagram of a telecommunications system 500 of a preferred embodiment that connects a first station set 510 associated with a first user and a second station set 520 associated with a second user. The system 500 of FIG. 5 is identical to the system 200 of FIG. 2 except that the first station set 510 of the system of FIG. 5 also is coupled with a telephony application means (the first telephony application means 530). The first 530 and second 580 telephony application means can be connected through the central office 540 or, alternatively, though a data network 535. In the latter case, the second telephony application means 580 can include, for example, a gateway to connect to the data network 535. Accordingly, while the second telephony application means 580 is shown as one block in FIG. 5, it can comprise several elements. It is important to note that the terms "first" and "second" are used merely to illustrate the operation of the system 500 and that functions performed by a "first" element also can be performed by a "second" element even though not explicitly stated. For example, the functions described with regard to the first telephony application means 530 also can be performed by the second telephony application means 580.

Figure 6:
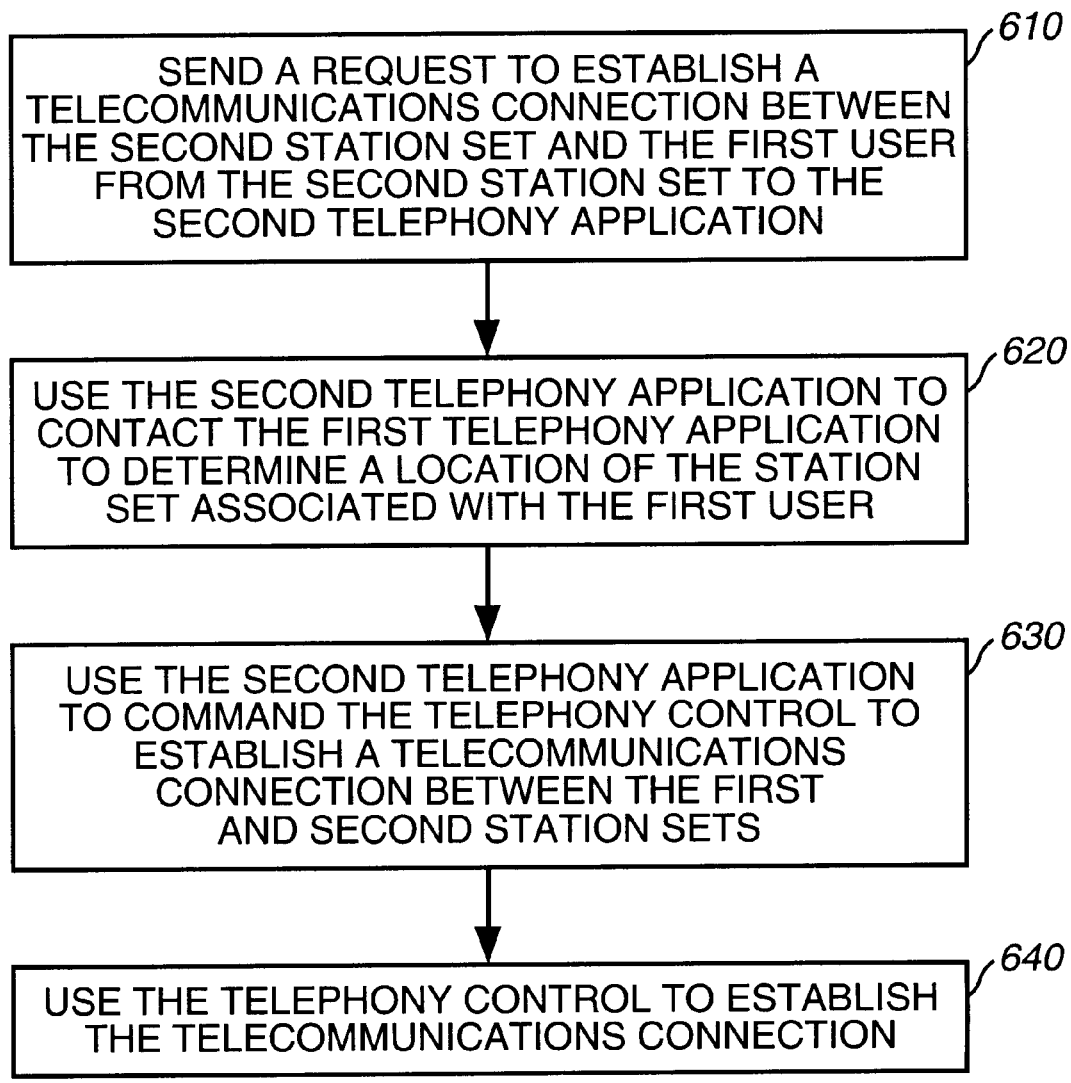
FIG. 6 is a flow chart of a method of a preferred embodiment for establishing a telecommunications connection between two users without one user knowing the phone number or location of the other.

The system 500 of FIG. 5 can implement a method for establishing a telecommunications connection between two users without one user knowing the phone number or location of the other. This method is shown in the flow chart of FIG. 6 and comprises the steps of sending a request to establish a telecommunications connection between the second station set and the first user from the second station set to the second telephony application means (step 610), using the second telephony application means to contact the first telephony application means to determine a location of the station set associated with the first user (step 620), using the second telephony application means to command the telephony control means to establish a telecommunications connection between the first and second station sets (step 630), and using the telephony control means to establish the telecommunications connection (step 640).

Figure 7:
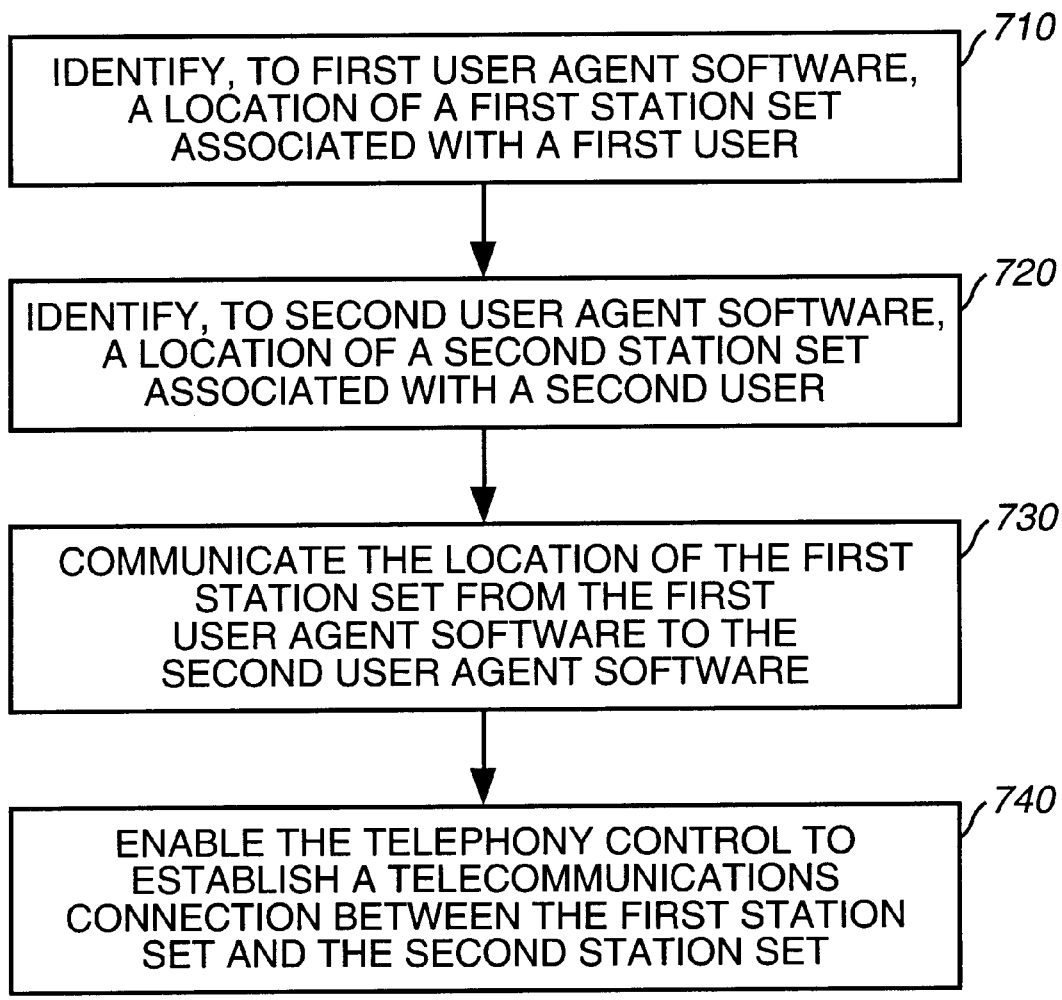
FIG. 7 is a flow chart of a method of a preferred embodiment for establishing a telecommunications connection using User and Terminal Agents.

As shown in the flow chart of FIG. 7, in terms of User and Terminal Agents, this method comprises the steps of identifying, to first user agent software, a location of a first station set associated with a first user (step 710), identifying, to second user agent software, a location of a second station set associated with a second user (step 720), communicating the location of the first station set from the first user agent software to the second user agent software (step 730), and enabling the telephony control means to establish a telecommunications connection between the first station set and the second station set (step 740). The operation of this method is described below.

In the above-described embodiments, when the second user placed a request for a telecommunications connection with the first user, the second user's User Agent located the first user's phone number and commanded the telephony control means to establish a connection to the station set connected to the line associated with that number. In this preferred embodiment, the second user's User Agent determines the location of the first user's User Agent by using a local or remote look-up table, for example. Once it obtains this information, the second user's User Agent contacts the first user's User Agent to determine the location of the station set associated with the first user (i.e., the first station set 510). As mentioned above, the connection between the first 530 and second 580 telephony application means can take place through the central office 540 or through the data network 535.

Once the second user's User Agent knows the location of the first station set 510, it communicates the location to the Terminal Agent. Using this information, the Terminal Agent commands the telephony control means 570 to generate the appropriate signals required for the central office 540 and/or public switched telephone network 550 to make a telecommunications connection between the first 510 and second 520 station sets. Instead of automatically sending the location information to the second user's User Agent, the first user's User Agent can determine whether the information should be sent. For example, if the first user is in a meeting and only wants to accept calls from his office, he can program his User Agent to send his station set location only to a select group of people. Additionally, when the first user's User Agent receives a location request from the second user's User Agent, the first user's User Agent can ask the first user if he wants to accept the call.

A first user's User Agent also can be used to determine what location information should be sent to the second user's User Agent and when it should be sent. The first user's User Agent can be programmed, for example, with the daily schedule of the first user. When the first user's User Agent receives a station set location request from the second user's User Agent, the first user's User Agent can use the schedule to determine which station set location would be closest to the first user given the time the request is made. In another example, if the schedule shows that the first user in unavailable to take calls, the first user's User Agent can transmit the station set location to the second user's User Agent when the first user becomes available, thus postponing the connection. If the second user's User Agent is similarly programmed, many of the frustrations of telephone tag can be eliminated.

Figure 8:
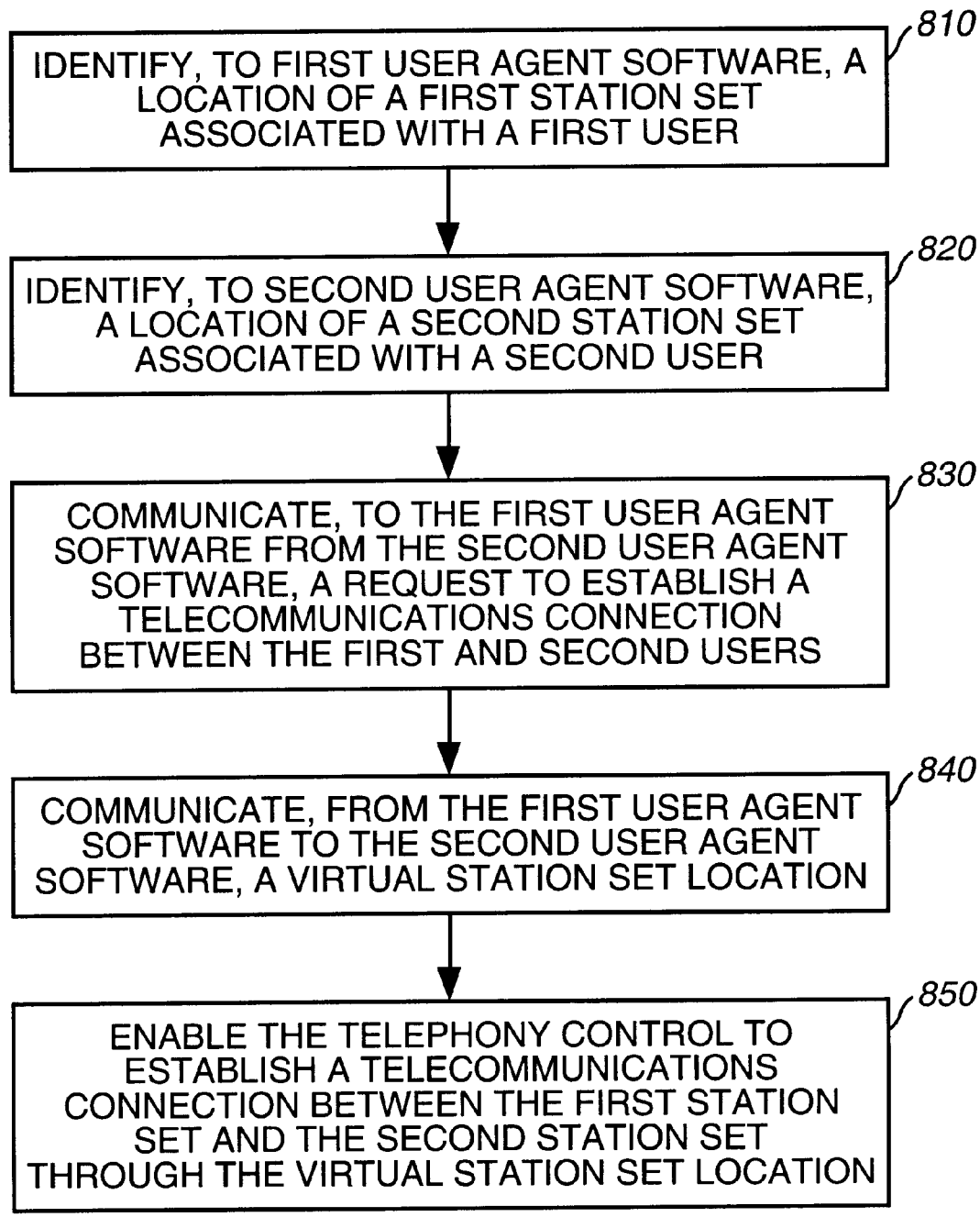
FIG. 8 is a flow chart of a method of a preferred embodiment for establishing a telecommunications connection without either user knowing the location of the other.

In the above-described interactions between user agents, the first user's User Agent sends the exact location of the station set of the first user. In an alternative embodiment, a telecommunications connection can be established without either user knowing the location of the other, as shown in the flow chart of FIG. 8. This method comprises the steps of identifying, to first user agent software, a location of a first station set associated with a first user (step 810), identifying, to second user agent software, a location of a second station set associated with a second user (step 820), communicating, to the first user agent software from the second user agent software, a request to establish a telecommunications connection between the first and second users (step 830), communicating, from the first second user agent software to the second user agent software, a virtual station set location (step 840), and enabling the telephony control means to establish a telecommunications connection between the first station set and the second station set through the virtual station set location (step 850).

Specifically, instead of sending the location of the first station set, the first User Agent can send the location of a Virtual Terminal Agent—a Terminal Agent not associated with any particular station set. The second user's Terminal Agent commands the telephony control means 570 to direct all communications to the Virtual Terminal Agent, which forwards communications to the first station set 510. Similarly, communications from the first station set 510 are sent to the second station set 520 through the Virtual Terminal Agent. In this way, a "shielded" connection can be established between the two users.

In the above examples, the first user has only one User Agent associated with him. Because a request to establish a telecommunications connection can take many forms, multiple User Agents can be employed to handle such requests. For example, a call directed to "Mr. Smith, Sales Manager" can be handled by the User Agent that is responsible for routing Mr. Smith's business calls, while a call to "Mr. Smith, Little League Coach" can be handled by a User Agent in charge of Mr. Smith's personal affairs.

As described above, User Agents enable a telephone network to direct calls to particular people rather than to particular station sets. Where calling locations (such as a business or residence) have a community of station sets, a user may not know which particular user to contact and, accordingly, may wish to place a call to the location generally. In such a situation, a Group User Agent associated with the community of station sets can be used to determine which station set in the community should receive the call. A Group User Agent can run, for example, on a local telephony application server associated with the community of station sets, as described on FIG. 10 and in the "ADSL Line Supporting a Community of Station Sets" section below.

For example, a Group User Agent can be used in a business with a community of station sets used by employees, each of whom has a User Agent that knows his job function. If a customer requests a connection with a sales agent, the Group User Agent polls the individual User Agents to determine which of the employees can help with a sales call. When that employee is identified and agrees to take the call, the Group User Agent transfers the call to him and can create an appropriate sales user interface on his station set display. If no one in the sales department can be found, the Group User Agent evaluates the job functions of other employees for the best possible match and can send a special "sales wizard" application to the station set of the chosen employee to help him handle the call. In this way, businesses can increase the effectiveness of their communication with customers. A Group User Agent can similarly be used in residential applications to direct a call to a particular family member. The Group User Agent also can know about voice or email messages addressed to the family and can alert whoever is using the station set that there is an urgent message for someone else in the family.

Hardware Implementations

The telecommunications system described above can be implemented with any appropriate hardware and software, as illustrated in the following embodiments. As mentioned above, one block shown in the above-referenced figures can comprise several elements. For example, while the second telephony application means 580 in FIG. 5 is shown as one block, it can comprise a gateway coupled with a data network. It is important to note that the embodiments described below merely illustrate particular implementations of the invention and should not be interpreted to limit the invention in any way.

Analog Local Loops and Data-Over-Voice Modems

Figure 9:
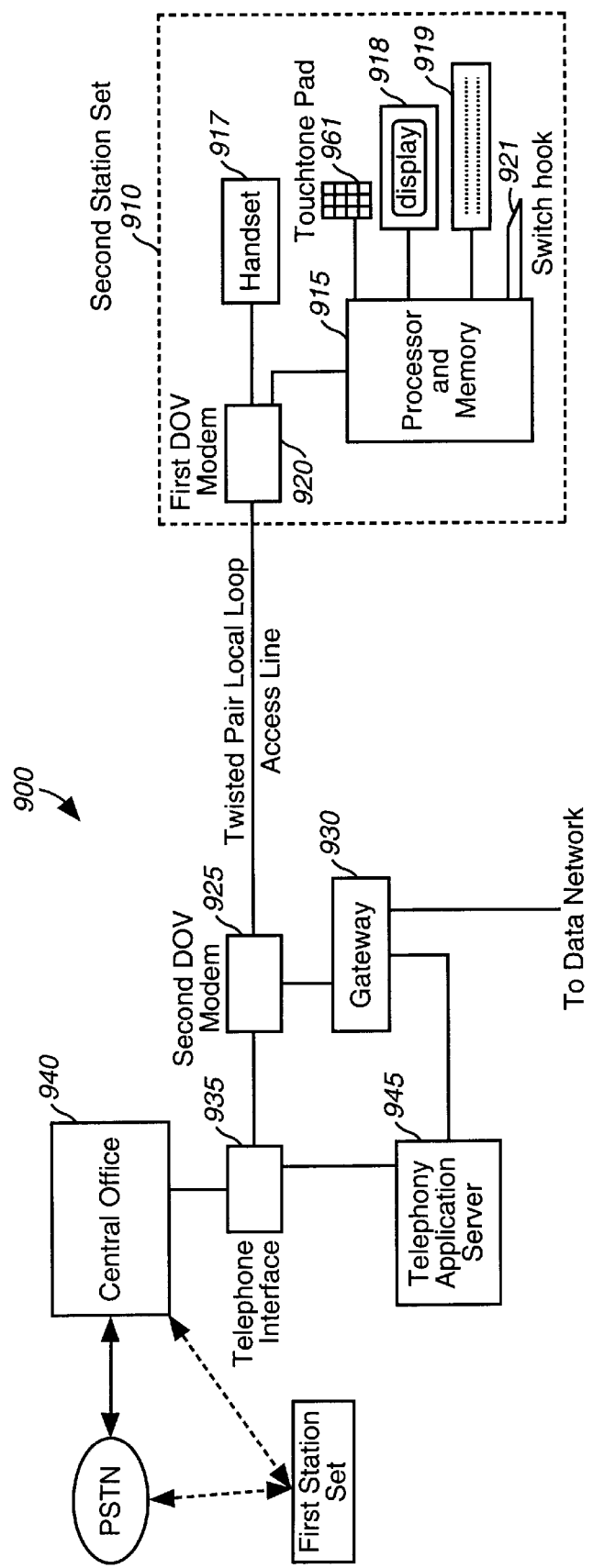
FIG. 9 is a block diagram of a telecommunications system of a preferred embodiment using analog local loops and data-over-voice modems.

FIG. 9 is a block diagram of a telecommunications system 900 of a preferred embodiment using analog local loops and data-over-voice modems. The station set 910 of this preferred embodiment comprises a processor and memory unit 915 coupled with a touch-tone pad 961, a display 918, a keyboard 919, and a switch hook 921. A first data-over-voice ("DOV") modem 920 is coupled with the processor 915 to create a data path and is coupled with a handset 917 to create a voice path. The first DOV modem 920 couples the station set 910 with a matched second DOV modem 925 at the central office side of an analog twisted-pair local loop.

At the central office side of the local loop, the second DOV modem 925 receives data and voice signals from the first DOV modem 920. Data signals representing a request to establish a telecommunications connection with another party are sent to the telephony application server 945, which determines the information needed to establish the connection. For example, a User Agent in the server 945 can contact a data network through a gateway 930 to locate the phone number of the requested party. The User Agent passes the information to the Terminal Agent in the server 945, which then instructs a telephone interface 935 to generate the appropriate signals (e.g., touch-tone signals, on- and off-hook signals, and switch hook flashes) to a line card in the central office 940 to establish a telecommunications connection between the station set 910 and the requested party's station set. The telephone interface 935 also detects call progress signals and reports them to the telephony application server 945. Voice signals from the central office 940 are sent to the station set 910 through the telephone interface 935 and the second DOV modem 925 through a voice path.

If the station set 910 is to be used primarily for telephony applications, it is preferred that the DOV modems 920, 925 operate at 28.8 Kbps or higher to provide more adequate bandwidth to collect user responses and pass high-level commands to the display object to draw the screen.

ADSL Line Supporting a Community of Station Sets

Figure 10:
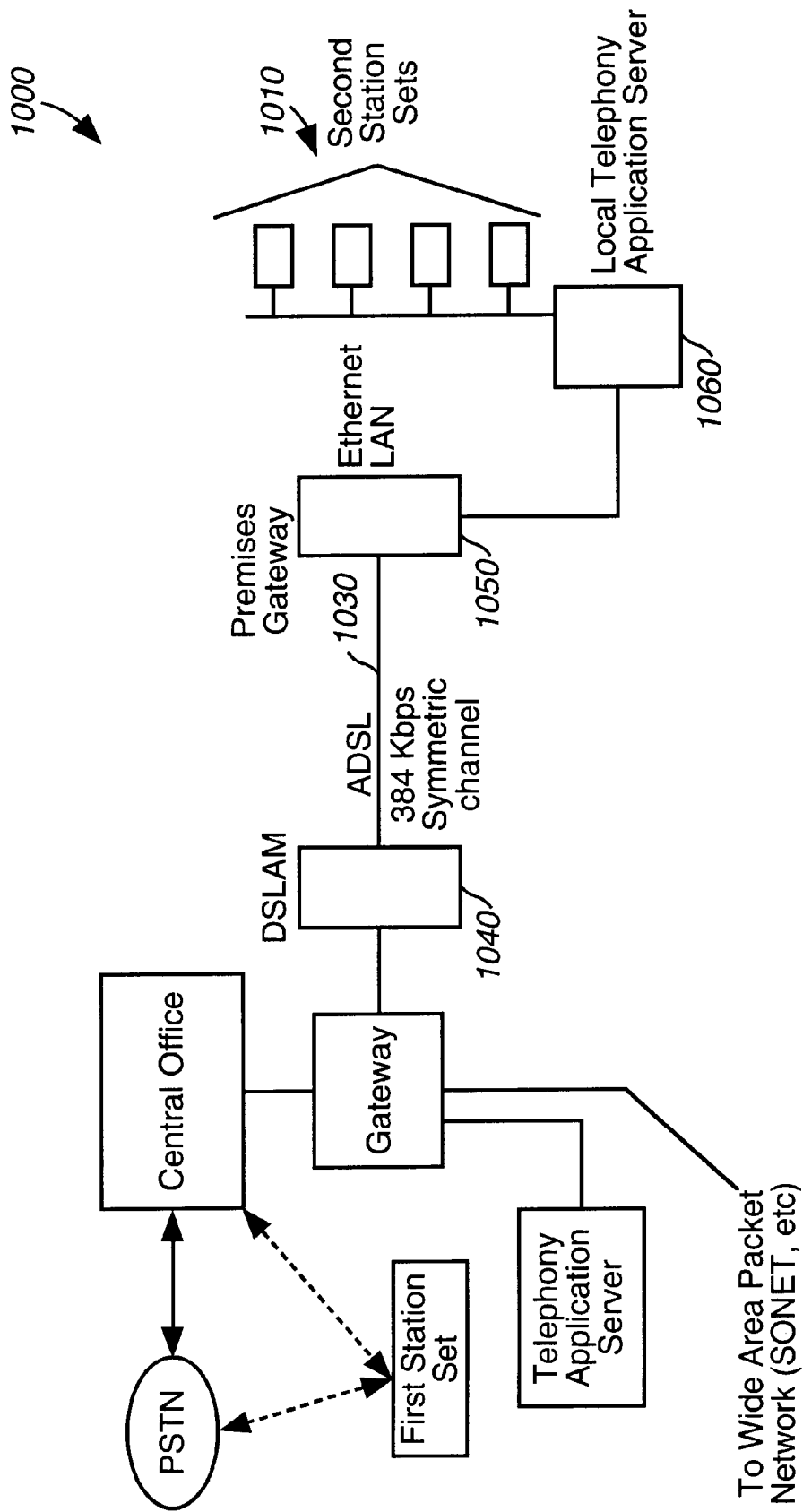
FIG. 10 is a block diagram of a telecommunications system of a preferred embodiment using one ADSL line supporting a community of station sets.

FIG. 10 is a block diagram of a telecommunications system 1000 of a preferred embodiment using one ADSL line supporting a community of station sets 1010. At a premises, a community of station sets 1010 is coupled with a local telephony application server 1060 and is connected on an Ethernet LAN (although any comparable transport technology can be used) using a premises gateway 1050 as a hub. An ADSL access line 1030 provides a channel between a Digital Subscriber Line Access Multiplexer ("DSLAM") 1040 and the premises gateway 1050.

The community of station sets 1010 places requests for telecommunications connections as described above. When a request for a telecommunications connection is received through the premises gateway 1050, however, a Group User Agent running in the local telephony application server 1060 determines which station set in the community of station sets 1010 should receive the call using the methods described above.

Although any digital subscriber line technology can be used, it is preferred that an ADSL access line be used since it provides continuous connectivity between the community of station sets 1010 and the network. The ADSL line preferably provides a 384 Kbps channel between the DSLAM 1040 and the premises gateway 1050. It also is preferred that each station set have a continuous 16 Kbps channel open to the local telephony application server 1060 and that this bandwidth be increased to at least 64 Kbps (32 Kbps for ADPCM voice and 32 Kbps for data) whenever a station set goes off hook. When using such a configuration, a single 384 Kbps channel can support six station sets.

In one alternative to this embodiment, a PC or workstation residing on the LAN can be used both as a station set and as an ordinary desk top machine if the PC or workstation is upgraded with analog circuitry operative to drive a handset and with station set client application software. In such an alternative embodiment, a LAN used by a small office can carry all data processing traffic in addition to providing telephony services.

ISDN Line

Figure 11:
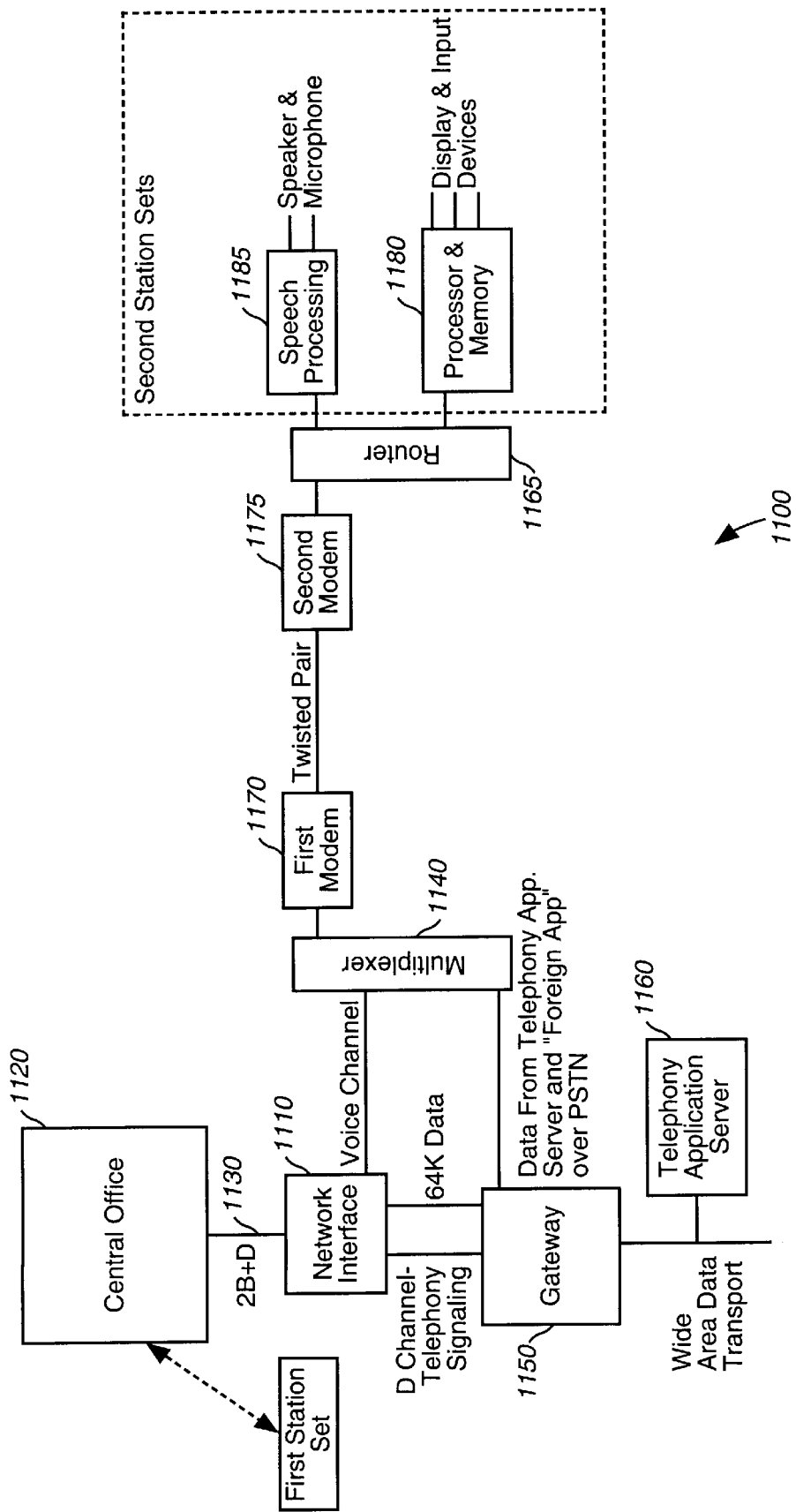
FIG. 11 is a block diagram of a telecommunications system of a preferred embodiment using an ISDN line.

FIG. 11 is a block diagram of a telecommunications system 1100 of a preferred embodiment using an ISDN line. In this embodiment, the connection between the network interface 1110 and the central office 1120 is a standard BRI 2B+D ISDN interface 1130. The network interface 1110 separates the packets on the B channel used for voice and forwards them without modification to a multiplexer 1140. The packets arriving on the other B channel (which might be used, for example, to send graphics data to the user in a multimedia teleconferencing service) and those on the D channel (which is used for telephony-related signaling between a "normal" ISDN station set or network interface and the central office 1120) are separated and sent to a gateway 1150. The Terminal Agent attends to all D channel communications, and none of these data are forwarded to the station set. The gateway 1150 combines any data arriving on the non-voice B channel and data from a telephony application server 1160 and sends them to the multiplexer 1140. The multiplexer 1140 combines the three data streams (voice, foreign applications, and telephony application server) into a single stream and sends them to the first modem 1170. The second modem 1175 and the first modem 1170 work together and can be of any technology, preferably one that supports a bit rate of at least 128 Kbps. The router 1165 at the customer premises divides the data stream into two logical streams: one destined for the processor 1180 and the other for the speech-processing module 1185.

One of the current obstacles to the wider deployment of ISDN is difficulty in provisioning customer premises equipment. This embodiment simplifies the process because all ISDN related equipment can be located at or near the central office. In another embodiment, the interface between the central office and the network is a primary rate interface ("PRI") with 24 B channels. If there were 12 or more station set subscribers at a single central office, it would probably be preferable to have a single PRI interface to the network interface 1110.

Conventional Analog Line with an ADSI Station Set

Figure 12:
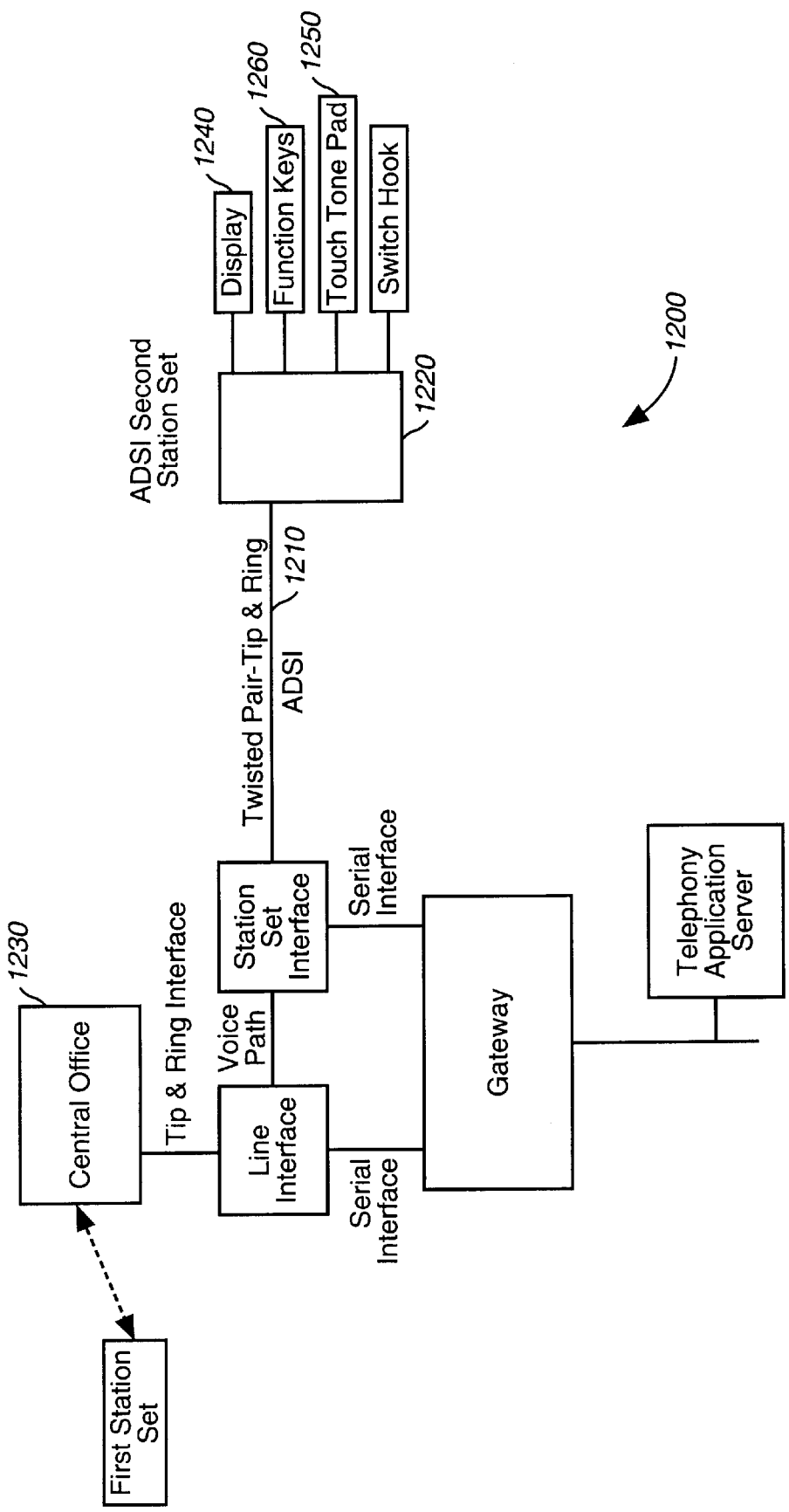
FIG. 12 is a block diagram of a telecommunications system of a preferred embodiment using a conventional analog line and an ADSI station set.

FIG. 12 is a block diagram of a telecommunications system 1200 of a preferred embodiment using a conventional analog line 1210 and an Analog Display Signaling Interface ("ADSI") station set 1220. The ADSI station set 1220 can be built using an electronic station set that communicates to equipment in the central office 1230 using an ADSI interface. Station sets having ADSI capabilities have a low bit-rate data channel that can be used to both send characters to the station set for output on a display 1240 and to collect input from a user through a touch-tone pad 1250 or a set of function keys 1260, for example. The central office 1230 would not be aware that it was talking to an ADSI telephone—all the ADSI capabilities communicate between the User Agent and the station set. It is important to note that while this embodiment uses an ADSI station set, other types of station sets using low-bit-rate signaling protocols can be used.

Hybrid Fiber-Coax Cable System to Connect a Station Set

Figure 13:
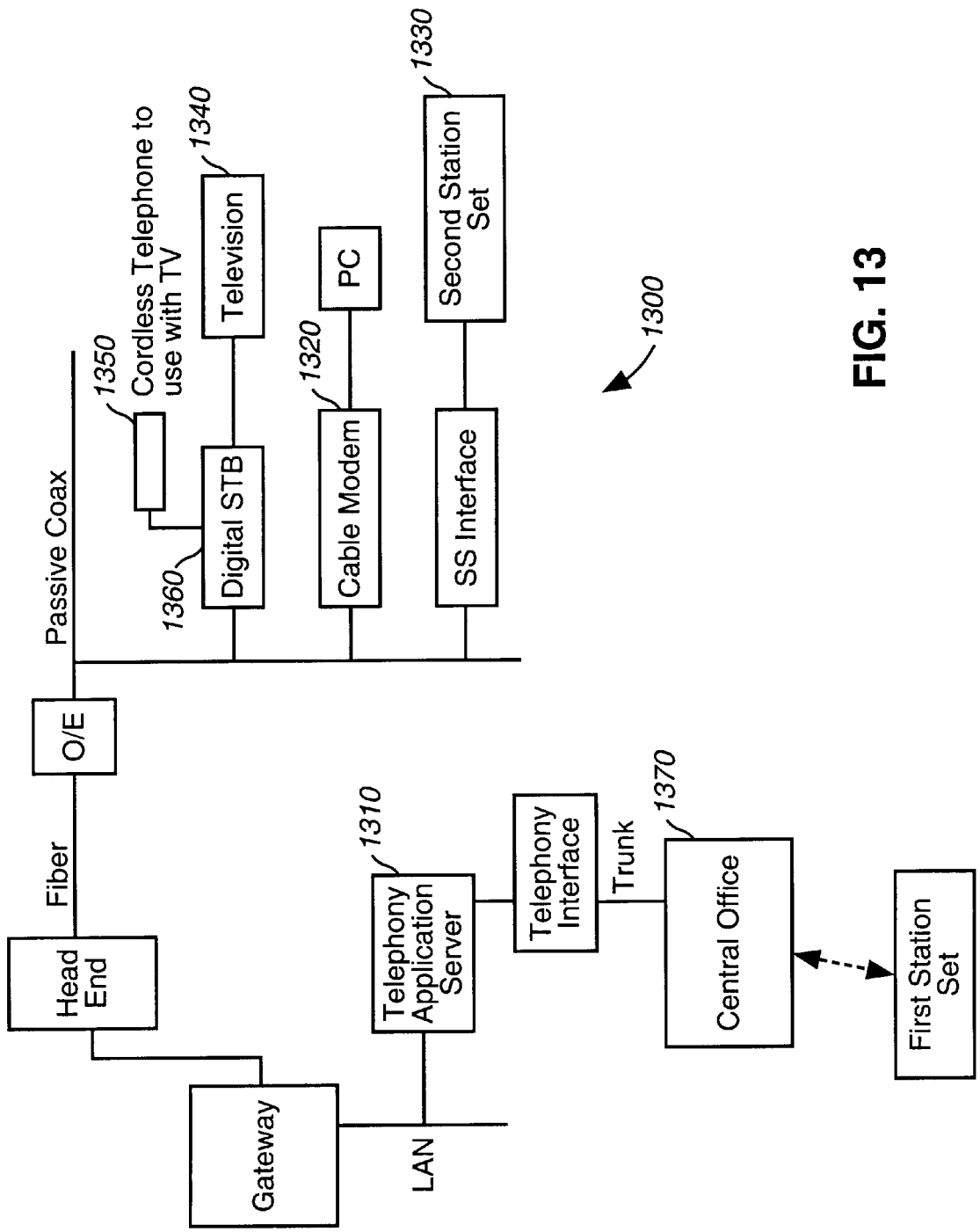
FIG. 13 is a block diagram of a telecommunications system of a preferred embodiment using a hybrid fiber-coax cable to connect a station set.

FIG. 13 is a block diagram of a telecommunications system 1300 of a preferred embodiment using a hybrid fiber-coax cable to connect a station set 1330. With a hybrid fiber-coax cable system, part of the bandwidth that is dedicated to supporting two-way cable modems can be used for much lower bandwidth station set modems. An incoming telephone call would appear on the telephony application server 1310 on a DID (direct inward dialing) trunk. The telephony application server 1310 would translate the telephone number into an address for a station set cable modem 1320 and send an appropriate alerting message to the station set 1330. If the user accepted the call, the user's speech would be compressed, preferably using 16 Kbps coding, and sent back over the cable to the telephony application server 1310, which would in turn send it to the local switch in the central office 1370. Similarly, the other party's speech would be compressed by the telephony application server 1310 and sent to the station set 1330, which would decompress it and play it to the user.

In one alternative to this embodiment, a television set 1340 can be used as a station set by connecting a cordless handset 1350 to a digital set top box ("STB") 1360. The voice path would be provided by the cordless handset 1350, and the digital STB 1360 would both compress and decompress speech. The handset 1350 preferably has additional function keys that would make its use as part of a station set more convenient. Rather than having a tip & ring interface to the network, the base station either can be on a serial port (RS-485, for example) or can have an Ethernet connection to the digital STB 1360.

Hybrid Fiber-Coax Cable and a Premises Gateway

Figure 14:
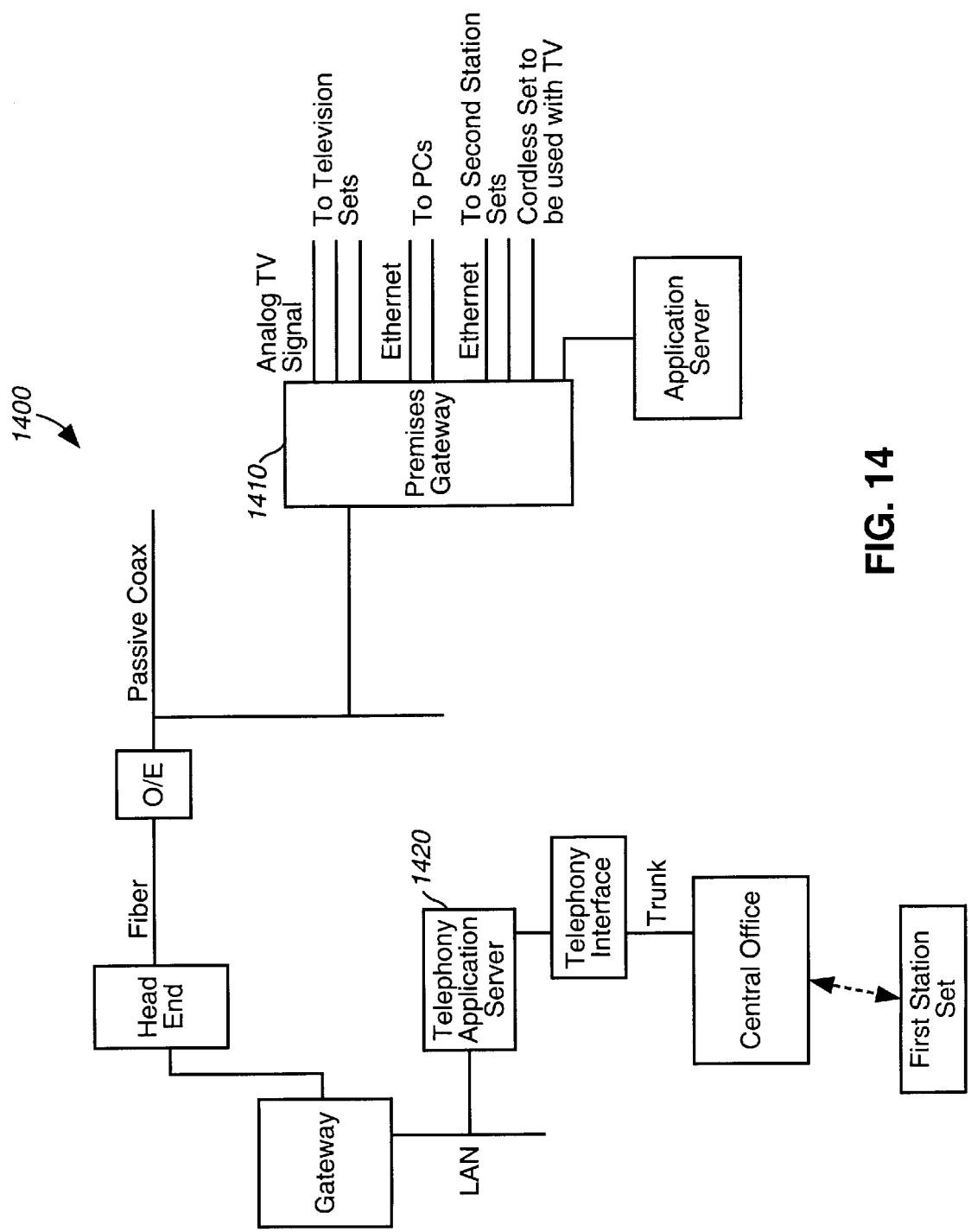
FIG. 14 is a block diagram of a telecommunications system of a preferred embodiment using a hybrid fiber-coax cable and a premises gateway.

FIG. 14 is a block diagram of a telecommunications system 1400 of a preferred embodiment using a hybrid fiber-coax cable and a premises gateway 1410, which acts as a router. A primary advantage of this embodiment is that PCs, television sets, and station sets can all be used for telephony. If PCs are equipped with the necessary hardware, they can be fully functional station sets. Television sets can be used to alert the user to incoming messages by writing a message to the screen. If the user had a cordless telephone, the cordless telephone can be used to provide the speaking path and to collect user inputs, and the television set can be used as a display device. It is preferred that the station set client be running in the telephony application server 1420, which is the device best positioned to ensure synchronization of user input and user displays. In the embodiment illustrated in FIG. 13, a particular cordless handset 1350 was used with one television set. For the system shown in FIG. 14, a cordless handset can be used with any display device (i.e., any television set, PC, or station set). The handset preferably has a display selector control to select a telephony window display on all or part of the screen.

Wireless LAN

Figure 15:
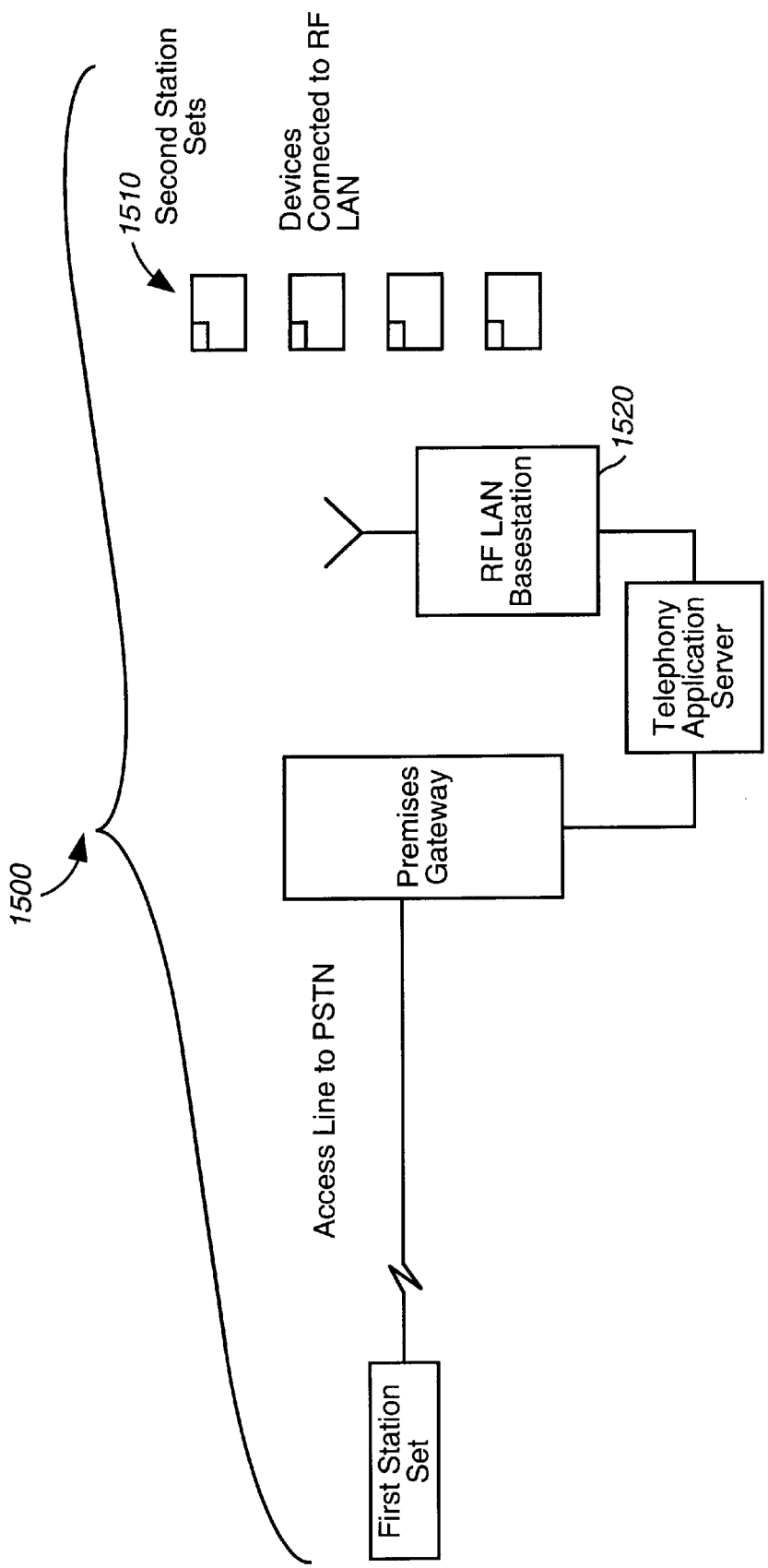
FIG. 15 is a block diagram of a telecommunications system of a preferred embodiment using a wireless LAN.

FIG. 15 is a block diagram of a telecommunications system 1500 of a preferred embodiment using a wireless LAN. A residence or business can have numerous devices 1510 that are capable of playing and capturing speech signals, displaying text messages, and displaying graphics. As an alternative to using a station set with an integrated display and handset, a user can choose any device with a convenient cordless handset and another device with a convenient display. Maximum flexibility is provided by using an RF LAN 1520 so that devices can be freely positioned anywhere in the residence or business.

There are many ways that users can assemble their own station set from convenient piece parts. For example, there can be contact plates on both handsets and displays (fixed or portable), and the devices can be associated by bringing them into contact with one another. Alternatively, devices can have very low power RF transmitters to enable them to be aware of each other only when they are placed a few inches apart. Devices also can be equipped with IR transmitters and receivers so that two devices can become associated when the IR transmitter of one sends a unique identifying signal to the IR receiver of another. As another alternative, an identification number can be associated with each device. In this alternative, a device with a user input device can be used to enter the identification number of another device with which it will be associated.

Standard Analog Line and a Conventional Touch-Tone Telephone

As an alternative to using a station set with a display and additional user input devices, a conventional touch-tone telephone station set 1605 and a standard POTS line 1607 can be used. FIG. 16 is a block diagram of a telecommunications system 1600 of a preferred embodiment using such an alternative. A line interface 1610 is coupled with a central office 1620 using a standard tip-and-ring interface 1630 and provides an audio path from the station set interface 1640 to the central office 1620. The line interface 1610 looks like a conventional touch-tone station set to the central office 1620. When instructed to do so by the Terminal Agent running in the telephony application server 1660, the line interface 1610 can send any signal that can be sent by a touch-tone phone (e.g., touch tone dialing, on hook, off hook, and flash). Call progress signals (e.g., dial tone, busy, fast busy and human speech) returned from a switch in the central office 1620 are identified, and the Terminal Agent is notified.

The station set interface 1640 continuously monitors the output of the station set 1605 to detect for touch-tone (DTMF) signals and can be in one of three states. In "Pass-Through" mode, the station set interface 1640 transparently passes all auditory signals from the station set 1605 to the line interface 1610. DTMF signals are auditory signals and can pass to the central office 1620 just as speech can. In "Bypass" mode, the auditory signals from the station set 1605 are not passed to the central office 1620. If the station set interface 1640 detects touch-tone signals, their "names" are passed to the gateway 1650 and then to the telephony application server 1660, which hosts the User Agent. In "Listen" mode, touch-tone signals are identified and the telephony application server 1660 is told about them, but the path between the station set 1605 and the line interface 1610 remains open to allow these signals to be passed to the central office 1620.

When the station set 1605 is in an idle state (not ringing) and the receiver goes off hook, the station set interface 1640 is in the Bypass mode. The off-hook signal is not passed to the line interface 1610, and the central office 1620 is not aware that the station set 1605 has gone off hook and will not receive any other signaling from it. If the touch tone signals are prefixed with a special alerting sequence (e.g., any sequence that is not a legitimate message to the switch, such as ""), the gateway 1650 will recognize that the user is initiating a dialog with the User Agent in the telephony application server 1660. The gateway 1650 will then pass to the telephony application server 1660 the identity of the station set 1605 so that the telephony application server 1660** can create the appropriate User Agent. The User Agent will rely on a dialog structure in which the User Agent communicates with audible prompts (presumably stored or synthesized human speech) and the human user responds with spoken commands or dialed digits. However, except for limitations imposed by the interface technology, the user will have full access to the User Agent.

In general, whenever the gateway 1650 can determine that the central office 1620 is expecting user input (typically when the analog signaling interface reports dial tone from the switch or when the station set 1605 was idle and goes off hook), the station set interface 1640 will be placed in "Bypass Mode." By using this mode, the user can always gain access to the User Agent for help in placing telephone calls (by using a speed call list, for example) or for accessing voice mail or any other User Agent functionality.

The user also can use the station set 1605 as if it were a conventional touch-tone telephone. If no alerting signal is detected, dialed digits go to the station set interface 1640, which sends them through the gateway 1650 to the telephony application server 1660. The User Agent will determine that the user is just dialing a telephone number, and the Terminal Agent will instruct the line interface 1610 to go off hook. When the line interface 1610 receives dial tone, it will inform the Terminal Agent, which sends commands to the line interface 1610 to outpulse the digits already dialed by the user. When the line interface 1610 outpulse stream and the stream of digits being dialed by the user can be made synchronous, the station set interface 1640 is instructed to enter Listening mode. The audio path from the station set 1605 is connected directly to the line interface 1610, and the Terminal Agent software ceases sending outpulse commands to the line interface 1610. In effect, the station set interface 1640, the telephony application server 1660, and the line interface 1610 are doing a simple "store-and-forward" operation on the digits being dialed by the user. In the unlikely event that the line interface 1610 is unable to draw dial tone from the central office 1620, the User Agent can wait until the user has apparently finished dialing and then send an error message in the form of stored or synthesized human speech.

A user may also need access to the User Agent during the course of a call. For example, the user may wish to make a three-way call and would like to use their personal telephone directory maintained by the User Agent. If the user enters the alerting sequence during a stable call, the touch-tone digit(s) will be passed to the switch and be heard by the other party. The station set interface 1640 will then be placed in Bypass mode, and the audio path from the user to the switch will be suspended. The user can then, for instance, look up a telephone number in the personal directory maintained by their User Agent. The User Agent also can try to establish a three-way call. For example, if the line interface 1610 detects busy or fast busy on the line, the User Agent will be informed and can then generate a spoken message informing both parties to the call that the party to be added was unavailable and offer to try again in a few minutes.

It also is possible for the User Agent to initiate a dialog with the user. For example, when the station set 1605 goes off hook, the User Agent can cause the ordinary dial tone to be replaced by a special tone (e.g., a stutter dial tone typically used to signal voice mail) or even a spoken message. Similarly, at any time when the user is off hook, the User Agent can provide an auditory message to the user. This message can be inserted into the line without disturbing the connection to the central office 1620. In that case, if there were a talking path to another person, the other person would probably hear the message (with some attenuation). Alternatively, the connection between the user and the central office 1620 can be suspended, and the user can receive a private message.

It is intended that the foregoing detailed description be understood as an illustration of selected forms that the invention can take and not as a definition of the invention. It is only the following claims, including all equivalents, that are intended to define the scope of this invention.

What is claimed is:

1. A telecommunications system comprising:

a first station set operative to generate a request for a telecommunications connection with a second station set;

telephony application means, remotely located from said first station set, operative to generate, in response to said request, a command to establish a telecommunications connection between said first station set and said second station set;

telephony control means, remotely located from said first station set and coupled with said telephony application means, operative to establish said telecommunications connection in response to said command;

an access line coupling said first station set with said telephony application means;

wherein the request is not recognizable by the telephony control means until the telephony application means translates the request; and wherein said first station set comprises a first data-over-voice modem, and wherein the invention further comprises a second data-over-voice modem external to both said first and second station sets and coupled with said first data-over-voice modem, said telephony control means, and said telephony application means.

2. The invention of claim 1, wherein said access line comprises an analog local loop.

3. The invention of claim 1, further comprising a data network, and wherein said telephony application means comprises a telephony application server and a data gateway coupled with said server and said data network.

4. A telecommunications system comprising:

a first station set operative to generate a request for a telecommunications connection with a second station set;

telephony application means, remotely located from said first station set, operative to generate, in response to said request, a command to establish a telecommunications connection between said first station set and said second station set;

telephony control means, remotely located from said first station set and coupled with said telephony application means, operative to establish said telecommunications connection in response to said command;

an access line coupling said first station set with said telephony application means;

wherein the request is not recognizable by the telephony control means until the telephony application means translates the request;

wherein said access line comprises a digital subscriber line; and wherein the telephony application means comprises a premises gateway coupled with said first station set; and wherein the invention further comprises a digital subscriber line access multiplexer coupled with said premises gateway.

5. The invention of claim 4, wherein the telephony application means further comprises a local telephony applications server coupled with said first station set.

6. A method for establishing a telecommunications connection, said method comprising the steps of:

(a) sending a request to establish a telecommunications connection between a first station set and a second station set, said request being sent from said first station set to a telephony application means remotely located from said first station set;

(b) using said telephony application means to command a telephony control means remotely located from said station set to establish a telecommunications connection between said first and second station sets; and (c) using said telephony control means to establish said telecommunications connection;

wherein the request is not recognizable by the telephony control means until the telephony application means translates the request.

* * * * *